United States Patent
Mackintosh et al.

(10) Patent No.: US 12,234,650 B2
(45) Date of Patent: Feb. 25, 2025

(54) DOWNSPOUT DEBRIS CAPTURE SYSTEM AND METHOD

(71) Applicants: Eric Mackintosh, Tyler, TX (US); Heath Hicks, Tyler, TX (US)

(72) Inventors: Eric Mackintosh, Tyler, TX (US); Heath Hicks, Tyler, TX (US)

(*) Notice: Subject to any disclaimer, the term of this patent is extended or adjusted under 35 U.S.C. 154(b) by 238 days.

(21) Appl. No.: 17/875,829

(22) Filed: Jul. 28, 2022

(65) Prior Publication Data

US 2023/0034568 A1 Feb. 2, 2023

Related U.S. Application Data

(60) Provisional application No. 63/226,361, filed on Jul. 28, 2021.

(51) Int. Cl.
*E04D 13/08* (2006.01)
*B01D 29/31* (2006.01)
*B01D 29/96* (2006.01)

(52) U.S. Cl.
CPC ............ *E04D 13/08* (2013.01); *B01D 29/31* (2013.01); *B01D 29/96* (2013.01); *E04D 2013/086* (2013.01); *E04D 2013/0866* (2013.01)

(58) Field of Classification Search
CPC ............ E04D 13/08; E04D 2013/0806; E04D 2013/0813; E04D 2013/082; E04D 2013/086; E04D 2013/0866; E04D 13/0765; B01D 29/31; B01D 29/96; B01D 29/27; B61D 35/02; E03F 5/14
USPC ...................................................... 52/16, 12
See application file for complete search history.

(56) References Cited

U.S. PATENT DOCUMENTS

| | | | | |
|---|---|---|---|---|
| 2,595,538 | A * | 5/1952 | Rausch | E03B 3/02 210/447 |
| 2,814,529 | A | 11/1957 | Arnt | |
| 3,966,121 | A * | 6/1976 | Littman | B05B 1/20 239/197 |
| 4,470,908 | A * | 9/1984 | Odekirk | B01D 35/00 210/463 |
| D301,164 | S * | 5/1989 | Weaver | 52/16 |
| 4,935,132 | A * | 6/1990 | Schaier | B01D 17/0202 210/485 |
| 5,107,635 | A * | 4/1992 | Carpenter | E04D 13/076 52/12 |
| 5,230,798 | A * | 7/1993 | Rogman | B01D 29/96 52/12 |

(Continued)

OTHER PUBLICATIONS

Technische, 125 m drainage filter sock drain sleeve for drainage pipes DN 200, webpage, accessed Jun. 10, 2021, 2 pages.

(Continued)

*Primary Examiner* — Kyle J. Walraed-Sullivan
(74) *Attorney, Agent, or Firm* — Standley Law Group LLP; F. Michael Speed; Adam J. Smith (57) ABSTRACT

Devices, systems, and methods for capturing debris from downspouts are provided. Downspout debris collection devices are installed to exits of downspouts of a gutter system for a building. A construction activity is performed at a roof of the building and netting collects debris exiting the downspouts while allowing water to escape. The downspout debris collection devices, with the collected debris trapped therein, are subsequently removed and at least the collected debris are disposed of.

15 Claims, 6 Drawing Sheets

(56) References Cited

U.S. PATENT DOCUMENTS

| | | | | |
|---|---|---|---|---|
| 5,358,007 | A * | 10/1994 | Carlberg | F16L 27/08 137/561 A |
| 5,406,966 | A * | 4/1995 | Lepkowski | E04D 13/08 210/162 |
| 5,427,417 | A * | 6/1995 | Lechuga | E03C 1/12 52/12 |
| 5,637,211 | A * | 6/1997 | Neff | B01D 29/27 210/501 |
| 5,772,882 | A * | 6/1998 | Chang | B01D 35/04 52/16 |
| 5,985,158 | A * | 11/1999 | Tiderington | B01D 29/35 52/12 |
| 6,162,075 | A * | 12/2000 | Hara | H01R 13/633 439/159 |
| 6,334,953 | B1 * | 1/2002 | Singleton | B01D 29/27 405/36 |
| 6,631,588 | B1 * | 10/2003 | Distler | E04D 13/0409 52/302.1 |
| 8,689,837 | B1 | 4/2014 | Smith | |
| 9,663,964 | B2 * | 5/2017 | Kurani | B01D 29/27 |
| 10,550,985 | B1 * | 2/2020 | Proctor | F16L 55/02745 |
| 10,605,395 | B1 * | 3/2020 | Green | F16L 55/1141 |
| 2005/0109693 | A1 * | 5/2005 | Allard | B01D 35/02 210/162 |
| 2008/0138156 | A1 * | 6/2008 | Janesky | E04D 13/08 405/40 |
| 2008/0251150 | A1 * | 10/2008 | Denooy | F15D 1/001 138/37 |
| 2008/0295418 | A1 * | 12/2008 | Edell | E04D 13/08 52/12 |
| 2010/0199574 | A1 * | 8/2010 | Perlatti | E04D 13/08 52/12 |
| 2010/0200482 | A1 * | 8/2010 | Perlatti | B29C 66/53246 210/170.03 |
| 2013/0330127 | A1 * | 12/2013 | DeLoach | E04D 13/08 405/80 |
| 2015/0299012 | A1 * | 10/2015 | Greco | C02F 1/286 210/232 |
| 2016/0040820 | A1 * | 2/2016 | Morris | F15D 1/04 138/89 |
| 2017/0211277 | A1 * | 7/2017 | Kerr | E03B 3/02 |
| 2017/0284077 | A1 * | 10/2017 | Deurloo | B01D 29/96 |
| 2018/0016792 | A1 * | 1/2018 | Valdez | F16L 37/02 |
| 2018/0274240 | A1 * | 9/2018 | Kilbert | F16L 25/0009 |
| 2020/0078711 | A1 * | 3/2020 | Neumann | C02F 1/001 |
| 2020/0199879 | A1 * | 6/2020 | Liu | E04D 13/064 |
| 2021/0040744 | A1 * | 2/2021 | Aziz | E04D 13/08 |
| 2021/0301537 | A1 * | 9/2021 | Ellis | E04D 13/08 |
| 2023/0020313 | A1 * | 1/2023 | Faucette | C02F 1/004 |

OTHER PUBLICATIONS

Frost King, Automatic Plastic Drain Away, webpage, accessed Jun. 10, 2021, 3 pages.

New Pig, Pipsock, webpage, accessed, Jun. 10, 2021, 1 pages.

Storm Water Systems, StormX Netting Trash Trap, accessed Jun. 10, 2021, 7 pages.

* cited by examiner

DOWNSPOUT DEBRIS CAPTURE SYSTEM AND METHOD

CROSS-REFERENCE TO RELATED APPLICATIONS

This application claims the benefit of U.S. provisional patent application Ser. No. 63/226,361 filed Jul. 28, 2021, the disclosures of which are hereby incorporated by reference as if fully restated herein.

TECHNICAL FIELD

This application relates generally to debris collection systems and apparatuses for downspouts, and methods involving the same.

BACKGROUND AND SUMMARY OF THE INVENTION

Gutter systems, such as those found on commercial and residential buildings, are used to collect water from roofs of such buildings and direct the collected water away from the buildings, generally through one or more downspouts. Such roofs and/or gutter systems occasionally need maintained. Roofing construction debris, such as nails and portions of roofing materials, may be inadvertently or otherwise collected in such gutter systems. By way of non-limiting example, roofing construction debris may be inadvertently dropped and naturally travel down a sloped roof and be collected into one or more gutter troughs. While roofing contractors may attempt to collect this type of debris, the number and size of such debris makes thorough collection difficult, and often times at least some roofing construction debris being unintentionally left behind at a worksite.

When collected in such gutter systems, such debris may be discharge into lawns or other areas, which may be unsightly. Furthermore, such leftover debris may clog or otherwise impede the flow of stormwater through the gutter system, underground downspouts, storm drawings, or the like, and/or or other normal functionality. Even if dispersed through the downspouts, such debris can clog downstream systems and/or be unsightly and unwanted by building owners, construction crews, or the like for various reasons.

Current downspout debris collection solutions require significant, and generally permanent, alterations to either or both of the gutters or the downspouts. For example, the Flex Grate Downspout Filter, available from InvisaFlow LLC of Alpharetta, GA, requires the removal of a section of downspout prior to installation of the Downspout Filter. Consumers may not be able willing to make significant or permanent alterations such as these. This is particularly true for debris generated by construction or maintenance activities.

Accordingly, what is needed is a downspout debris collection system, particularly which is temporary, easy to install and remove, and potentially disposable. Downspout debris collection systems and apparatuses, as well as methods related to the same, are provided. The disclosed downspout debris collection systems may be configured for temporary installation to one or more downspouts, may be easily installed and removed, and may be disposable. The downspout debris collection system may comprise a filtering portion, which may comprise one or more nettings, and a securing portion, which may comprise one or more elastic bands. The netting may comprise two or more different types of materials for improved filtration and/or debris capture. By way of non-limiting example, the netting may comprise a first layer having apertures of a first size, and a second layer atop the first layer having apertures of a second size. The first and second layers may be provided over some or all of the netting, and may entirely or partially overlap.

The securing portion of such downspout debris collection systems may be configured to fit about openings for one or more standard size downspouts. The collecting portion of such downspout debris collection systems and apparatuses may be configured to capture debris above a predetermined size and permit water or other fluids to pass therethrough. The securing portion, by way of non-limiting example, may comprise one or more areas having a relatively high coefficient of friction (e.g., textured, rubberized surfaces), so as to grip and maintain connection to downspouts.

The debris collection systems may be installed to one or more downspouts, preferably before beginning a construction job. Upon completion of the construction work, the gutters and/or downspouts may optionally be flushed to assist with removal of any such debris and/or check for clogging. Alternatively, or additionally, the debris collection systems may be left installed at the downspouts such that normal rainfalls over a period of time flush the gutters and/or downspouts of any such debris. The debris collected in the debris collection systems may be removed with removal of the debris collection systems. The debris collection systems may be removed after flushing and/or after a period of several rainfalls. The debris collection systems may be disposed, or the debris removed and the debris collection systems reused. In exemplary embodiments, the debris collection systems may be installed by the individuals or entities performing the construction job and removed by the building owner or caretaker after several days of normal rainfall, however any individual or entity may perform the installation and/or removal of the debris collection systems.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings. Illustrative, non-exhaustive examples, which may be, but are not necessarily, claimed, of the subject matter according the present disclosure are provided below.

Referring to FIG. 1 through FIG. 6, to a debris collection system 100 for downspouts 12 of a gutter system for a building or other structure, such as for collecting storm water or other precipitation, are provided. The debris collection systems 100 may be applied to downspouts 12 as a way of catching debris 14 originating from such gutters. Such debris 14 may include, for example without limitation, debris 14 associated with roofing construction or maintenance work such as, but necessarily limited to, nails, small pieces of roofing material, fasteners, combinations thereof, or the like, organic debris such as leaves and branches, or other materials captured in the gutters.

In exemplary embodiments, the debris collection system debris collection system 100 may comprise a filtering portion 20. The filtering portion 20 may comprise netting, screen, mesh, or other material having consistent or variable size apertures 26 for collecting debris 14, such as above a given size and allowing liquids and/or particulate below the given size to pass therethrough. The filtering portion 20 may comprise multiple portions 20A, 20B have different size apertures 26 or other filtering qualities. For example, without limitation, the filtering portion 20 may comprise a first portion 20A having relatively small or no apertures for collecting smaller or all debris encountered. The filtering portion 20 may comprise a second portion 20B having relatively large or some apertures 26 for permitting liquids and particulate below the given size to pass therethrough. The size of such apertures 26 may be selected to retain typical roofing construction work items including, but not limited to, fasteners, pieces of shingles larger than approximately 0.1 square inches, tape, staples, tools, combinations thereof, or the like. By way of non-limiting example, the multiple portions 20A, 20B of the filtering portion 20 may comprise multiple layers, which may be provided atop and/or adjacent to one another. The multiple portions 20A, 20B may entirely or partially overlap. The multiple portions 20A, 20B may have the same or different size and/or shape. The multiple portions 20A, 20B may comprise the same or different materials and/or be of a same or different type.

The first portion 20A may be located at a distal end of the filtering portion 20 and may form a generally bucket-shape and/or semi-spherical shape in exemplary embodiments to capture debris 14. The first portion 20A may be configured to let liquid and particulate below the predetermined size to pass therethrough, and/or may force such liquid and particulate below the predetermined size through the second portion 20B. The first portion 20A may be configured to capture particulate above the predetermined size. The first portion 20A may be integrally formed with, sewn into, and/or otherwise permanently or semi-permanently attached to the second portion 20B. Alternatively, the first portion 20A may be removable attached to, or placed within, the second portion 20B.

The second portion 20B may surround the first portion 20A, though such is not required. The second portion 20B may be configured to extend to an exit of the downspout 12 when attached to the downspout 12 to ensure filtration of all materials exiting therefrom. The first and second portions 20A and 20B, respectively, may comprise the same or different materials. The filtering portion 20 may be configured to capture debris 14 that exit a downspout 12, such as above a same or different predetermined size, to which the debris collection system 100 while permitting water, other liquids, and minor particulate to pass therethrough. Any number, size, type, and arrangement of such portions 20B may be utilized.

In exemplary embodiments, without limitation, the second portion 20B comprises a larger surface area than the first portion 20A, which is placed within, and atop, the second portion 20B. The first portion 20A may comprise apertures of a smaller size than those of the first portion 20B. The first portion 20A may be secured to the second portion 20B or may left to rest therein. However, any number, size, type, and arrangement of such portions 20B may be utilized.

The debris collection system 100 may comprise a securing portion 40. The securing portion 40 may be located at a distal end portion of the filtering portion 20. The securing portion 40 may comprise one or more elastic bands. Alternatively, or additionally, the securing portion 40 may comprise cable ties, belts, rope, tape, adhesive, relatively high-friction surfaces, combinations thereof, or the like. The securing portion 40 may be configured to facilitate attachment of the debris collection system 100 to various downspouts 12, thereby temporarily affixing the filtering portion 20 in a manner which permits filtering of all materials exiting the downspout 12 to collect any debris 14 in such exiting materials. The securing portion 40 may permit relatively quick and easy attachment and removal of the debris collection system 100 in a non-permeant manner.

Some or all of the securing portion 40 may be integrally formed with, permanently attached to, and/or semi-permanently attached to, the filtering portion 20 or separate therefrom. For example, without limitation, the securing portion 40 may comprise an elastic band sewn into the filtering portion 20. Alternatively, the securing portion 40 may be removable attached to the filtering portion 20. Alternatively, or additionally, the securing portion 40 may comprise an elastic band separate from, and placed about, part of the filtering portion 20. As yet another example, without limitation, the securing portion 40 may comprise an integrated elastic band and a separate cable tie.

In exemplary embodiments, the securing portion 40 may comprise one or more surfaces having a relatively high coefficient of friction (e.g., textured surfaces, rubberized surfaces, adhesives, combinations thereof, or the like). By way of non-limiting example, the securing portion 40 may comprise an integrated elastic band having a textured surface on an inner portion thereof.

Figure 1:
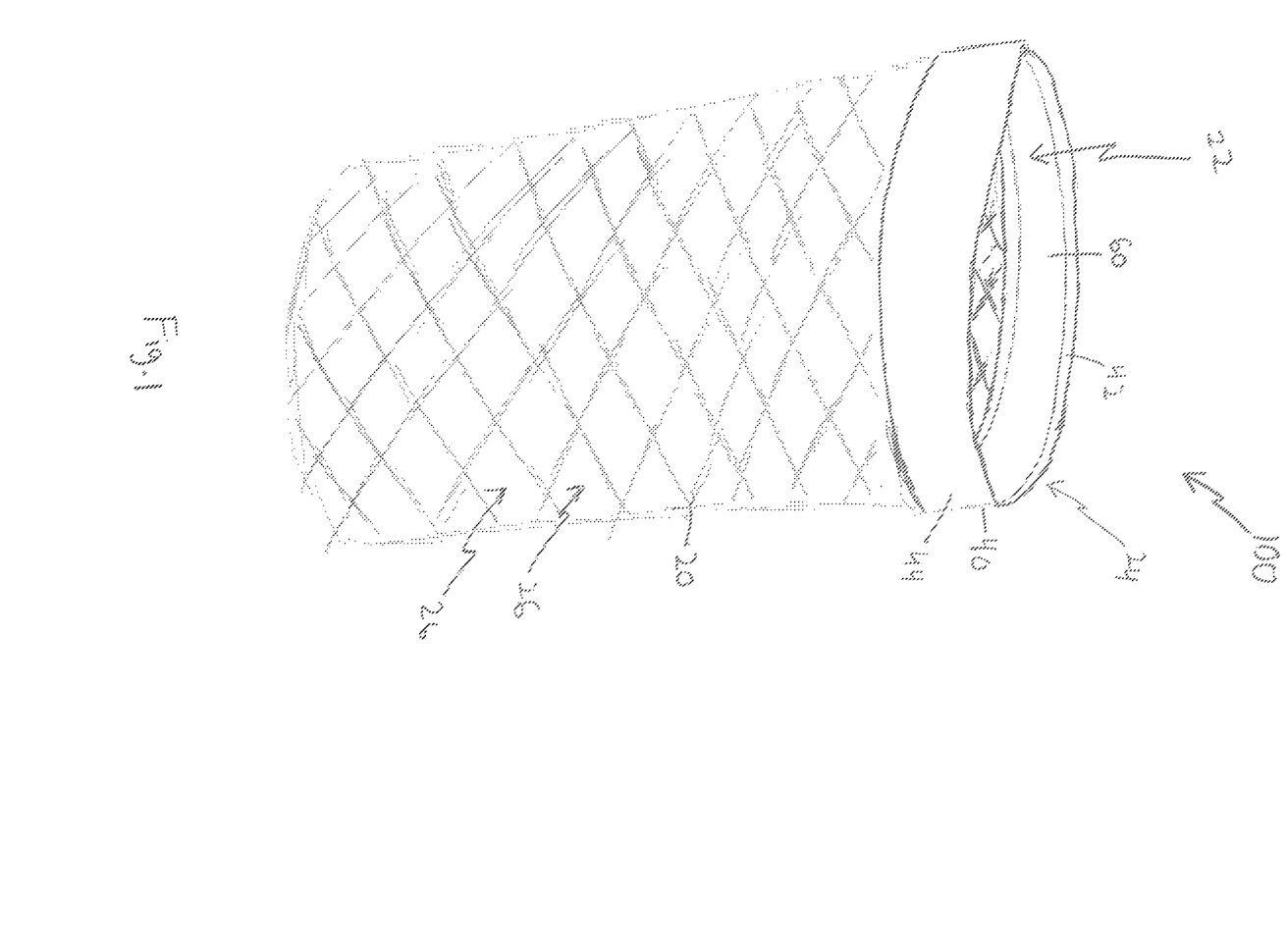
FIG. 1 is a perspective view of a downspout debris collection system.
Figure 2:
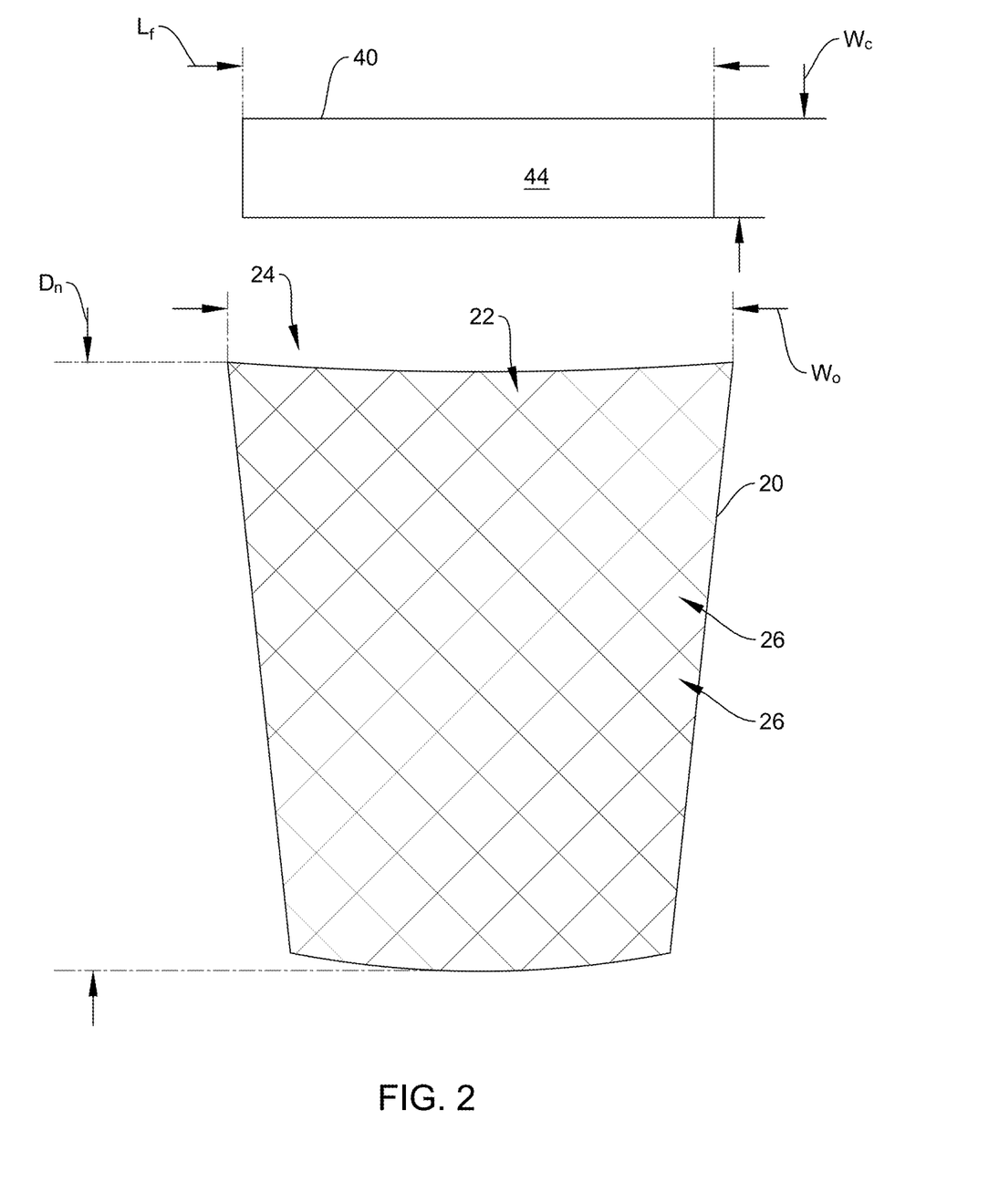
FIG. 2 is a front elevation view of the downspout debris collection system of FIG. 1 with the mesh portion and the elastic band separated for illustration purposes and laid flat.
Figure 3:
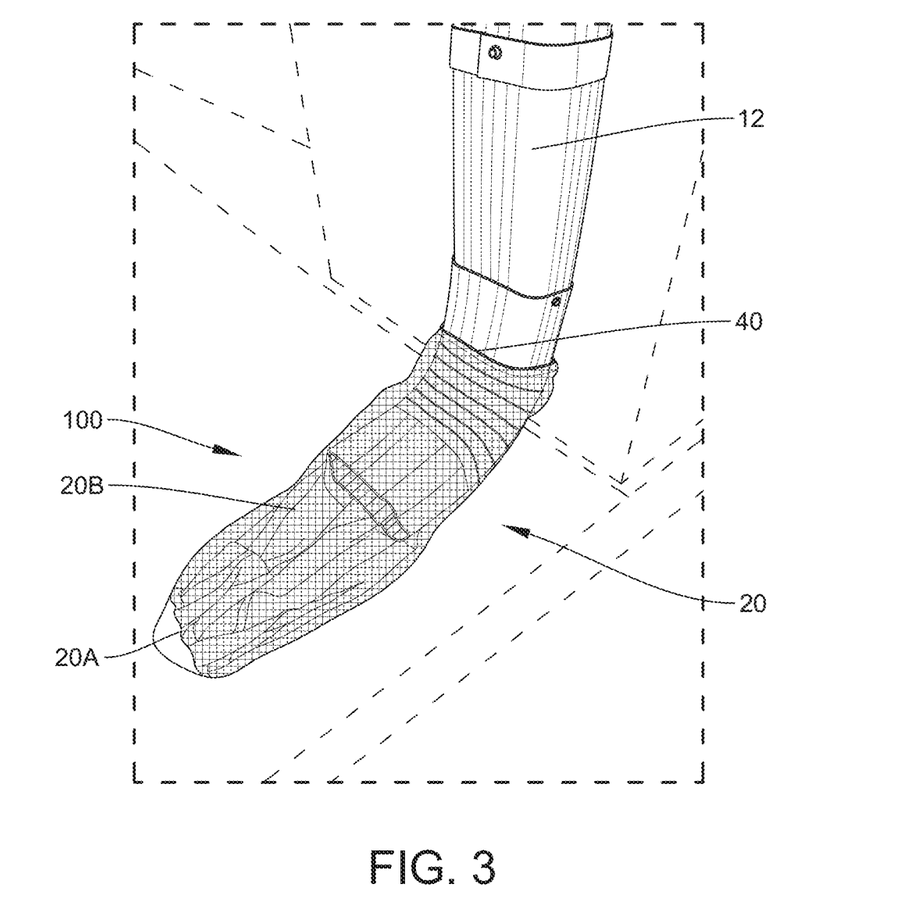
FIG. 3 is a perspective view of another exemplary downspout debris collection system installed onto an outlet of an exemplary downspout.
Figure 4:
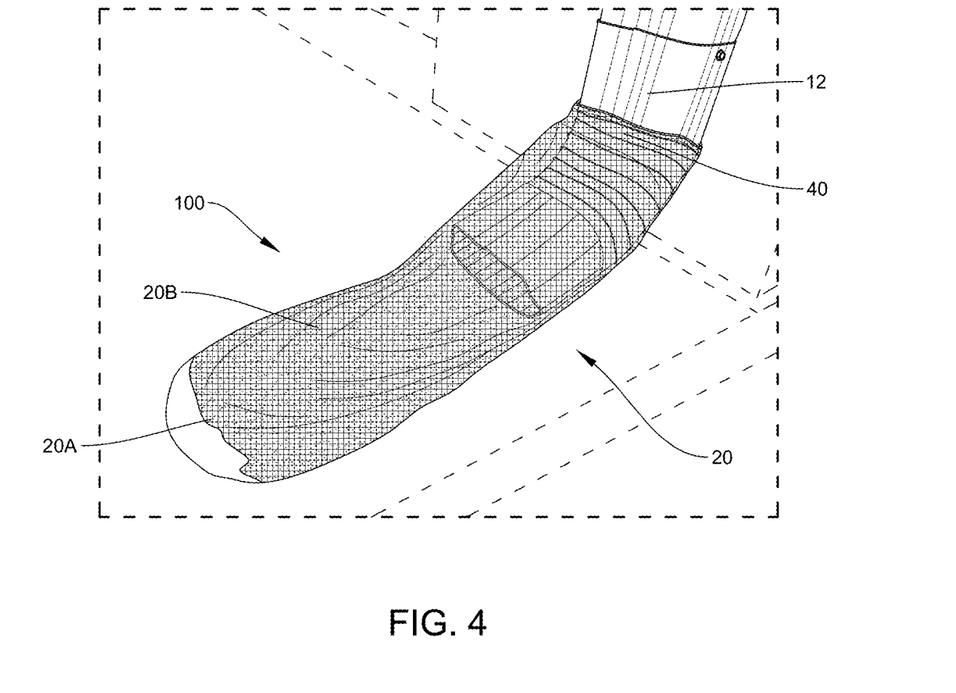
FIG. 4 is the downspout debris collection system of FIG. 3 in use filtering out water and catching debris.
Figure 5:
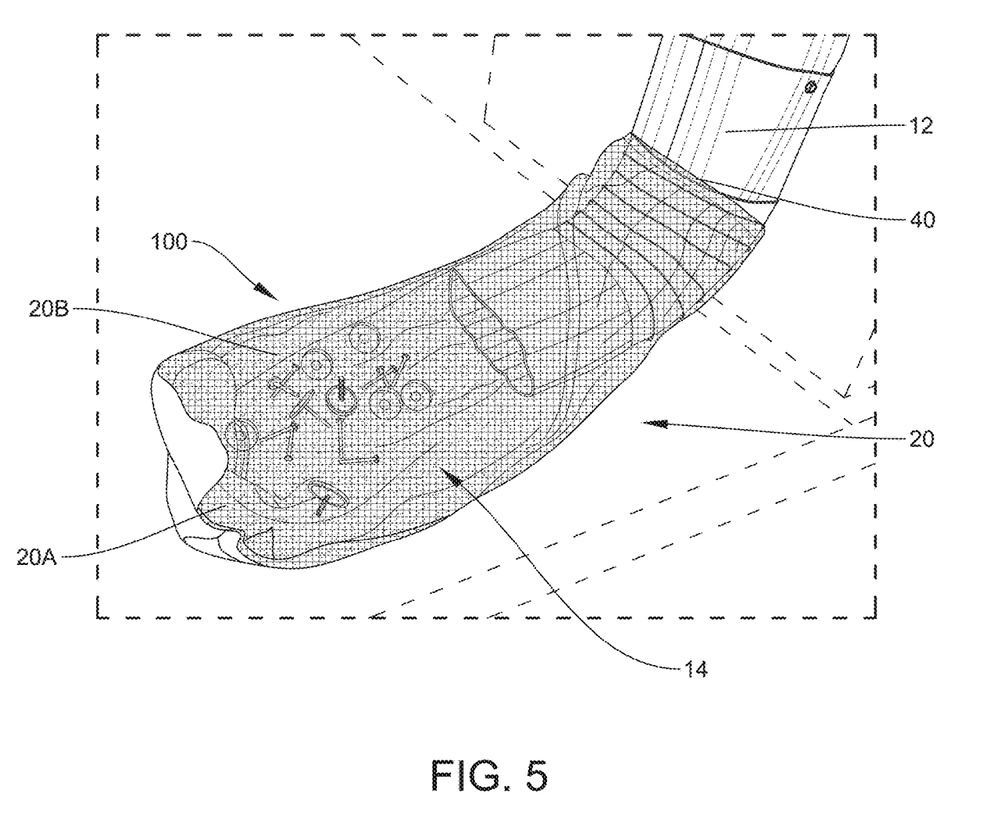
FIG. 5 is the downspout debris collection system of FIG. 3 containing debris.
Figure 6:
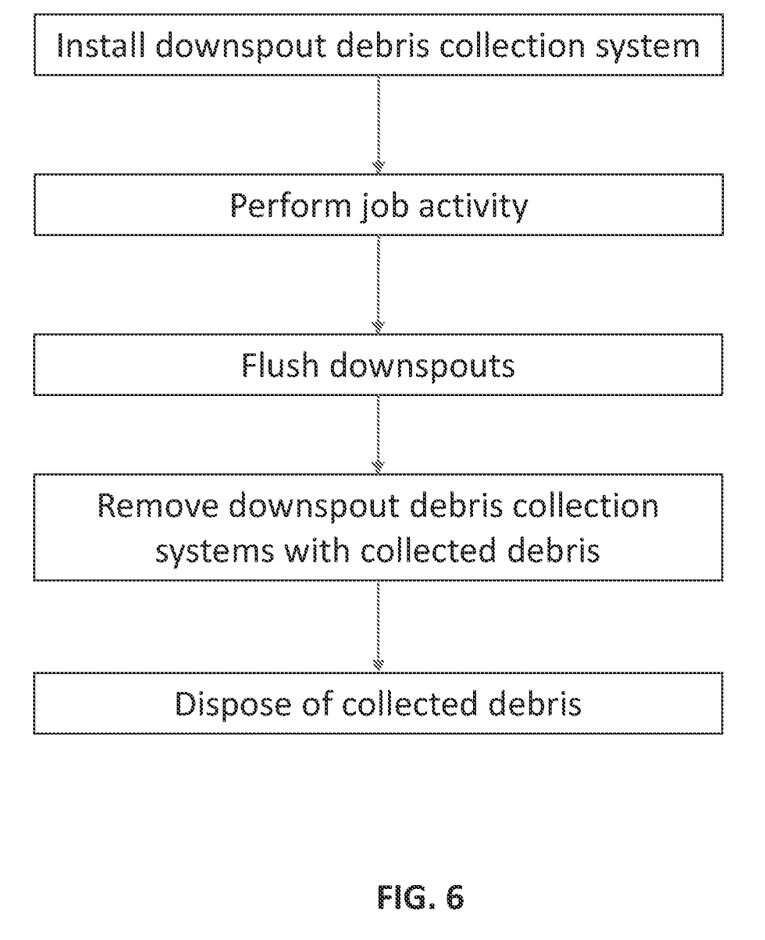
FIG. 6 is a flow chat for an exemplary method for using the debris collection systems of FIGS. 1-5.

As shown with particular regard to FIG. 6, the securing portion 40, for example without limitation, may be configured to permit attachment of the debris collection system 100 to one or more of the downspouts 12 of a building, such as before beginning a construction or maintenance job. While a job is being performed, by way of non-limiting example, roofing debris, such as but not limited to, nails, caps, roofing material, combinations thereof, or the like may be dropped or become dislodged and may naturally travel down a sloped roof surface into one or more gutter troughs. Upon completion of the construction or maintenance job, or at another time, the debris collection systems 100 may be removed from some or all such downspouts 12.

Optionally, some or all such downspouts 12 and/or associated gutters may be flushed, such as with water, to assist with debris 14 collection and/or check functionality of the same, prior to removing the downspout collection systems 100. By way of example, without limitation, flushing may involve pouring one or more buckets of water through one or more portions of the gutter system and/or downspouts and/or providing hose water to one or more portions of the gutter system and/or downspouts. Alternatively, or additionally, the debris collection systems 100 may be left installed at the downspouts 12 for a period of time such that the gutters and/or downspouts 12 are flushed by normal rainfall over the period of time.

The debris collection system 100 may be subsequently removed, such as by carefully collecting any captured debris therein upon removal. The collected debris 14 may be discarded with the debris collection system 100, though such is not required. For example, without limitation, the collected debris 14 may be discarded from the debris collection system 100 and the debris collection system 100 may be reused. In exemplary embodiments, without limitation, the debris collection systems 100 may be installed by the individuals of entities performing the construction job and removed by the building owner or caretaker after several days of normal rainfall, though any individual or entity may be involved with installation and/or removal of the debris collection systems 100.

As shown, the filtering portion 20 may define a generally elongated shape, with an interior 22 and an opening 24. By positioning the opening 24 about an exit area for the downspout 12, the filtering portion 20 may be received over the downspout 12 for filtering any materials exiting the downspout 12, such as to collect any debris 14 in such materials.

The physical dimensions of the filtering portion 20 may include a net depth $D_n$ and an opening width $W_o$. The net depth $D_n$ may include the depth of the filtering portion 20 measured from the top of the opening 24 to the bottom of the filtering portion 20. The opening width $W_o$ may include the width of the opening 24 when the filtering portion 20 is laid flat. Preferably, the filtering portion 20 may define a net depth $D_n$ of about 12 inches to about 42 inches, or more preferably about 24 inches in exemplary embodiments, without limitation. Preferably, the filtering portion 20 may define an opening width $W_o$ of about 2 inches to about 12 inches, or more preferably about 8 inches in exemplary embodiments, without limitation. The filtering portion 20 may be arranged in a manner such that the opening width may be variably sized with the securing portion 40, such as by overlapping portions of the filtering portion 20 and/or providing a tapered shape. In this manner, the securing portion 40, and thus opening width of the attached filtering portion 20, may be selectively expanded, such as by a user manually stretching the securing portion 40, to accommodate various size or shape downspouts 12.

These dimensions are merely exemplary and are not intended to be limiting. Any sizes, shapes, or other dimensions may be utilized. Those skilled in the art will appreciate that commercially available downspouts often feature either square, rectangular, or circular cross-sectional shapes. For square and rectangular downspouts, sizes typically range from about 3 inches to about 6 inches in length and about 4 inches to about 6 inches in width; and for circular downspouts, sizes typically range from about 3 inches in diameter to about 6 inches in diameter. These exemplary dimensions may be scaled either up or down to accommodate downspouts 12 of any size or shape and may be designed to accommodate a wide variety of so size and shaped downspouts 12.

In one exemplary embodiment, the filtering portion 20 may define a net depth $D_n$ of about 24 inches and an opening width $W_o$ that is variably expandable between about 2 and 10 inches. Such a filtering portion 20 may be suitable for square downspouts that are about 3-8 inches in length and about 4 inches in width; or for circular downspouts that are about 3-8 inches diameter.

The material composition of the filtering portion 20 may be varied without departing from the scope of the present disclosure. In exemplary embodiments, without limitation, the filtering portion 20 may be fabricated from a material that exhibits a sufficient degree of durability to withstand continuous outdoor use (i.e., exposure to sun and water), such as but not limited to, aluminum, fiberglass, polyester, copper-bronze, one or more metals or metal alloys, one or more polymers, combinations thereof, or the like. The filtering portion 20 may be fabricated from a material that is biodegradable in exemplary embodiments, without limitation. Such a material may include, for example without limitation, jute twine, hemp, organic materials, combination thereof, or the like.

The filtering portion 20 may comprise and/or define a number of apertures 26 of the same or different size and shape. The size, shape, number, and/or arrangement of such apertures 26 may be varied without departing from the scope of the present disclosure. In preferred embodiments, the aperture 26 size of the filtering portion 20 may range from about 0.010 inches to about 0.02 inches in either or both height and width dimensions for square or rectangular shaped apertures 26 or diameter for circular shaped apertures 26, though and size or shape apertures 26 may be utilized. The size, shape, number, and/or arrangement of such apertures 26 may be varied at different portions 20A, 20B of the filtering portion 20, such as based on the material used for such portion 20A, 20B.

To help retain the filtering portion 20 onto the downspout, a securing portion 40 may be connected to, permanently attached to, semi-permanently attached to, removably attached to, and/or integrally formed with, the opening 24 of the filtering portion 20. In exemplary embodiments, the securing portion 40 comprises one or more elastic bands positioned about an outer surface of the filtering portion 20. The securing portion 40 may be configured to normally have an opening width smaller than the downspout 12 and may be expanded to fit the downspout 12 and secured to the same by frictional forces. The securing portion 40, alternatively or additionally, may be secured to the downspout 12 by tape, adhesive, fasteners, combinations thereof, or the like.

The securing portion 40 may be integrally formed with the filtering portion 20, though such is not required. Alternatively, or additionally, the securing portion 40 may be sewn to the filtering portion 20. Alternatively, or additionally, at least portions of the securing portion 40 may be weaved through apertures 26 of the filtering portion 20. Alternatively, or additionally, the securing portion 40 may be glued or otherwise adhered to the filtering portion 20.

Those skilled in the art will appreciate that securing portion 40 may be described in terms of the following dimensions—flat length $L_f$ and cut width $W_c$. Flat length $L_f$ may be the length of the securing portion 40 when the securing portion 40 is laid flat. Cut width $W_c$ may be the width of the securing portion 40. Preferably, the securing portion 40 may be comprised of a fully or partially elastic material which defines a variable flat length $L_f$ of about 2 inches to about 10 inches, preferably resting at about 3 inches. Preferably, the securing portion 40 may define a cut width $W_c$ of about 0.1 inches to about 2 inches, or more preferably about 0.5 inches.

Preferably, the securing portion 40 may be provided with a grip material 60 to enhance retention onto the downspout 12. The grip material 60 may be applied to at least part of the securing portion 40. The grip material 60 may be applied to the interior surface 42 of the securing portion 40. Examples of the grip material 60 include, but are not limited to, textured rubber, adhesive, combinations thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for capturing debris from downspouts, said method comprising:
    installing downspout debris collection devices to exits of downspouts of a gutter system for a building, wherein each of said downspout debris collection devices comprise an elastic band and a filtering portion comprising flexible netting extending from said elastic band to form a closed end, and wherein installation of said downspout debris collection devices includes, for each of the downspout debris collection devices, stretching a respective one of the elastic bands, placing the respective one of the elastic bands about a respective one the exits, and allowing the respective one of the elastic bands to compress about the respective one of the exits such that the downspout debris collection devices, thereby enclosing the exits with the downspout debris collection devices, wherein said one or more elastic bands are part of securing portions permanently attached to said filtering portion by sewing the elastic bands into a respective one of the securing portions, wherein each of said securing portions comprises a textured or rubberized surface along an interior surface thereof;
    performing a construction activity at a roof of the building;
    removing said downspout debris collection devices and debris collected therein from said downspouts; and
    disposing of said debris collected in said downspout debris collection devices.

2. The method of claim 1 wherein:
    said exits of said downspouts are located above-ground.

3. The method of any one of claims 1-2 further comprising the steps of:
    flushing said downspouts with water following completion of said construction activity.

4. The method of claim 3 further comprising the steps of:
    reusing said downspout debris collection devices by installing said downspout debris collection devices to exits of downspouts of a gutter system for a second building;
    performing the construction activity at a roof of the second building;
    flushing said downspouts of said second building with water following completion of said construction activity at the second building;
    removing said downspout debris collection devices and debris collected therein from said downspouts of said gutter system of the second building; and
    disposing of said collected debris from said construction activity at said roof of the second building.

5. The method of any one of claims 1-4 further comprising the steps of:
    leaving said downspout debris collection devices installed for a period of time so as to permit flushing of said downspouts with rainfall following completion of said construction activity.

6. The method of any one of claims 1-5 further comprising the steps of:
    disposing of said downspout debris collection devices.

7. The method of claim 1 wherein:
    said filtering portion of each of said downspout debris collection devices comprises a first portion having apertures of a first size, and a second portion having apertures of a second size which is smaller than said first size.

8. The method of claim 7 wherein:
    said first portion of said filtering portion has a first surface area which larger than a second surface area of said second portion of said filtering portion; and
    said second portion is installed within said first portion.

9. The method of claim 1 wherein:
    each of said elastic bands are capable of taking on a circular or oval shape when relaxed.

10. A method for capturing roofing debris from downspouts, said method comprising:
    installing downspout debris collection devices to above-ground exits of downspouts of a gutter system for a building, including by, for each of the downspout debris collection devices:
    stretching elastic bands sewn into flexible netting of said debris collection devices, where said flexible netting extends from said elastic bands and forms a closed end, wherein a textured or rubberized surface is provided along an interior surface of each of the elastic bands;
    placing distal ends of said elastic bands about said exits of said downspouts such that said flexible netting, including said closed ends, extends therefrom and said debris collection devices enclose said exits; and
    allowing said elastic bands to compress about said downspout exits, wherein said flexible netting is configured to trap any of said roofing debris material above a predetermined size and permit water to escape said flexible netting;

performing a construction activity of a roof of the building;

flushing said downspouts with water following completion of said construction activity so that said roofing debris above said predetermined size are captured within said flexible netting and said water exits said flexible netting;

removing said downspout debris collection devices and said roofing debris collected therein from said exits of said downspouts of said gutter system; and disposing of said roofing debris collected in said downspout debris collection devices.

11. The method of claim 10 further comprising the steps of:

reusing said downspout debris collection devices at one or more additional job sites.

12. The method of any one of claims 10-11 wherein:

said flexible netting comprise a first portion comprising apertures of a first size and a second portion placed within said first portion and comprising apertures of a second size which is smaller than said first size.

13. The method of any one of claim 10-12 further comprising the steps of:

attaching cable ties about said flexible netting and said exits of said downspouts.

14. The method of claim 10 wherein:

each of said elastic bands are capable of taking on a circular or oval shape when relaxed.

15. A method for capturing roofing debris from downspouts, said method comprising:

installing downspout debris collection devices to above-ground exits of downspouts of a gutter system for a building by:

stretching elastic bands sewn into netting of said debris collection devices;

placing distal ends of said netting and said elastic bands about said exits of said downspouts; and allowing said elastic bands to compress about said downspout exits, wherein said netting is configured to trap any of said roofing debris material above a predetermined size and permit water to escape said netting;

performing a construction activity of a roof of the building;

flushing said downspouts with water following completion of said construction activity so that said roofing debris above said predetermined size are captured within said netting and said water is permitted to exit said netting;

removing said downspout debris collection devices and said roofing debris collected therein from said exits of said downspouts of said gutter system; and disposing of said roofing debris collected in said downspout debris collection devices;

wherein said netting comprise a first portion comprising apertures of a first size and a second portion placed within said first portion and comprising apertures of a second size which is smaller than said first size.

\* \* \* \* \*